UNITED STATES PATENT OFFICE.

GUSTAVUS J. ESSELEN, JR., OF SWAMPSCOTT, AND HARRY S. MORK, OF BROOKLINE, MASSACHUSETTS, ASSIGNORS TO ARTHUR D. LITTLE, INCORPORATED, OF CAMBRIDGE, MASSACHUSETTS, A CORPORATION OF MASSACHUSETTS.

CELLULOSE DERIVATIVE AND PROCESS OF PREPARING SAME.

1,425,580.  Specification of Letters Patent.  Patented Aug. 15, 1922.

No Drawing.  Application filed April 10, 1920.  Serial No. 372,969.

*To all whom it may concern:*

Be it known that we, (1) GUSTAVUS J. ESSELEN, Jr., and (2) HARRY S. MORK, citizens of the United States, residing at (1) Swampscott, (2) Brookline, in the counties of (1) Essex, (2) Norfolk, and State of Massachusetts, have invented certain new and useful Improvements in Cellulose Derivatives and Processes of Preparing Same, of which the following is a specification.

The present invention relates to cellulose derivatives and processes of preparing the same, and is particularly concerned with the ester cellulose butyrate.

Cellulose nitrate and cellulose acetate are well known for their uses in plastics, coating, etc. Cellulose nitrate has the disadvantage that it is highly inflammable, but in spite of this handicap it finds a wide range of usefulness. Cellulose acetate has the disadvantage that it is soluble only in special solvents. Although forms of cellulose acetate have been described which are soluble in hot mixtures of alcohol and benzol, the solutions which they yield gelatinize when cooled to room temperature.

We have discovered a new form of cellulose ester, cellulose butyrate, which is superior to both cellulose nitrate and cellulose acetate. Unlike cellulose nitrate, it is not highly inflammable; and its particular advantage over cellulose acetate resides in the fact that it is quite soluble in inexpensive solvents. It readily forms fluid solutions in a mixture of alcohol and benzol even at ordinary room temperatures.

Our new product has a wide variety of uses, among which may be mentioned its use in the manufacture of plastics, transparent sheets and films, artificial silk and filaments, lacquers, airplane dopes, artificial leather, etc.

The preferred process by which we produce the new cellulose derivative comprises in general two parts: (1) a preliminary treatment, and (2) the acylating or butyrating process. The object of the preliminary treatment is primarily to impregnate the cellulosic material with the catalyst employed in the reaction together with more or less of a diluent material which serves as a carrier for the catalyst. During this step there probably also occurs to a greater or less degree modification of the chemical composition of the cellulose, ordinarily considered as a hydration process. In the second part of the process the impregnated cellulose is converted into the desired ester. It is to be understood, however, that with slight modifications the process may be carried out in a single operation.

In making our cellulose esters, the preliminary treatment referred to is ordinarily carried out by using as carrier for the catalyst the organic acid of which the ester is to be produced. Thus in the preparation of cellulose acetate acetic acid is ordinarily used. In this instance the preference is, however, to use not the pure organic acid as the carrier for the catalyst, but rather the organic acid containing a small amount of water.

We have found that in the manufacture of cellulose butyrate it is not feasible to use butyric acid under these conditions as a carrier for the preferred catalyst, sulfuric acid, for the reason that although butyric acid and water mix readily and although butyric acid and sulfuric acid also mix readily, nevertheless if sulfuric acid is added to butyric acid in such amounts as might ordinarily be used for our purpose and then as little as 1%, by volume, of water is added, the resulting mixture separates into layers of which the lower layer contains almost all of the catalyst. It is not possible therefore to use butyric acid as the carrier for the catalyst if water is also present in more than very small amounts. This difficulty we overcome by adding a small amount of a substance which serves to prevent the separation into layers. Examples of such substances are methyl, ethyl and butyl alcohols, acetone, diacetone alcohol, ethyl acetate, etc. We have found denatured alcohol to be especially suitable.

In carrying out the preliminary treatment we prefer to use a bath of from 12 to 15 times the weight of the cellulose. The cellulose may be in any convenient form, such as cotton roving, yarn, linters, rags, etc., or in the form of wood pulp, paper, etc. It should preferably contain from 3.% to 6.% of moisture. The proportions of the ingredients used in the preliminary bath may vary within certain limits, and the following examples are to be construed purely as illustrative and not for the purpose of restricting the scope of the invention. We have used a preliminary bath composed of 4.0% sulfuric acid (sp. gr. 1.84), 4.8% water, 5.4% denatured alcohol (188 proof) and 85.8% butyric acid, all by weight. However, butyration after the use of such a preliminary bath resulted in a very rapid reaction difficult to control. Preferably we use a preliminary bath containing 0.5% to 0.6% sulfuric acid (sp. gr. 1.84), from 5.0 to 7.5% denatured alcohol, (188 proof) and from 94.5% to 91.9% butyric acid. With such a bath 90 minutes is a suitable time for allowing the cellulose to remain immersed. Although we prefer, as stated, to employ from 5.0% to 7.5% of denatured alcohol, it is possible to use widely different proportions and still get the desired result. Also, suitable quantities may be used of any of the other substances named which prevent stratification of the liquid mixture.

When using the suggested mixture of sulfuric acid, alcohol and butyric acid, it is advisable to make the bath up immediately before use. If it is allowed to stand a considerable length of time, separation into layers is noticeable. This is probably due to the esterification of the alcohol with the butyric acid. In this way the alcohol as such is removed from the bath and accordingly there is nothing present in the bath to keep the water produced in the esterification reaction from separating out with the sulfuric acid to form a separate layer. When such a preliminary bath is used before it has stood long enough for any separation to take place, there is no indication that the separation takes place subsequently.

It is possible to carry out the first part of our process by the use of acetic acid instead of butryic acid as the carrier for the catalyst. In this case it is not necessary to add alcohol or other material to prevent the separation into layers, but it is necessary to use a larger proportion of the catalyst in order to insure good results. The explanation of this may be that inasmuch as sulfuric acid and water mix with butyric acid only in very small amounts, when cellulose containing from 4.% to 6.% of moisture is introduced into the bath containing butyric acid, sulfuric acid and alcohol, the sulfuric acid is attracted by the cellulose to a much greater degree than when acetic acid is used. In other words, when butyric acid is used there are two forces both tending to cause adsorption of the sulfuric acid by the cellulose. One is what may be termed the normal adsorptive capacity of the cellulose as exhibited when a mixture of acetic and sulfuric acids is used. The second is the tendency for mixtures of water and sulfuric acid to form a phase distinct from the butyric acid. Since the water resides in the cellulose fibre, the water and sulfuric acid phase forms on the fibre instead of separating out in a layer at the bottom as it would if no cellulose were present.

After thorough impregnation of the cellulose with the catalyst as above described, the excess of the solution containing the catalyst is removed in any suitable manner as, for example, by pressing. The impregnated cellulose is then subjected to the action of the acylating bath composed of butyric anhydride mixed with butyric acid. As an acylating bath, we have found the following very suitable, but it is to be understood that we do not limit ourselves to the specific proportions named. For each 100 parts by weight of cellulose calculated on the untreated cellulose we may employ 465 parts butyric anhydrid (90.%) and 400 parts butyric acid.

If the proportions of the various materials have been properly regulated, there will be a rise in temperature which can be readily controlled and which need not exceed 40° or 50° C. The reaction is allowed to proceed until the product has the desired solubility. If a small proportion, for instance less than 1.%, of the sulfuric acid has been used in the preliminary treatment, it is advisable, we have found, after a test sample shows good solubility in chloroform, to add sulfuric acid to the butyrating mixture. For this purpose a mixture made up substantially of 5.% sulfuric acid (sp. gr. 1.84), calculated on the weight of the cellulose employed, and from 3.% to 5.% of water by volume of the butyrating bath is suitable; but the proportion of acid added may of course be varied. This accelerates the transformation and produces the desired solubility in benzol and denatured alcohol with less degradation of the product than if the reaction is allowed to proceed for a longer time without this addition.

The product prepared in the manner described above is soluble in chloroform, acetylene, tetrachloride, acetone, ethyl acetate, 90.% carbolic acid, hot denatured alcohol, hot benzol, and at room temperature in mixtures of alcohol, either ethyl or methyl, with benzol containing from 50.% to 95.% by volume of benzol. It is also soluble in mixtures of 75.% carbon tetrachlorid and 25.% denatured alcohol by volume, and in hot solvent naphtha. It is not soluble in normal butyl alcohol, solvent naphtha or carbon tetrachlorid at room temperature.

We claim:—

1. In the process of preparing cellulose esters the step which comprises subjecting cellulose to a preliminary impregnating bath containing a solution of butyric acid and a catalyst.

2. The process of preparing cellulose butyrate which comprises subjecting cellulose to a preliminary impregnating bath of sulfuric acid mixed with an organic acid carrier and water, and then subjecting the impregnated cellulose to a butyrating bath.

3. The process of preparing cellulose butyrate which comprises subjecting cellulose to a preliminary impregnating bath composed of sulfuric acid, butyric acid and water and a substance capable of preventing the sulfuric acid and water from forming a separate layer immiscible with the butyric acid, and then subjecting the impregnated cellulose to a butyrating bath.

4. The process of preparing cellulose butyrate which comprises subjecting cellulose to a preliminary impregnating bath composed of sulfuric acid, butyric acid, water and alcohol, and then subjecting the impregnated cellulose to a butyrating bath.

5. The process of preparing cellulose butyrate which comprises subjecting cellulose to a preliminary impregnating bath composed substantially of 0.5 to 4.% sulfuric acid, 85.8 to 94.5% butyric acid, 5.0 to 7.5% alcohol and 4.8% water, and then subjecting the impregnated cellulose to a butyrating bath.

6. In the process of preparing cellulose butyrate, the step which comprises subjecting cellulose to a preliminary impregnating bath comprising a solution of butyric acid and sulfuric acid.

7. In the process of preparing cellulose butyrate, the step which comprises subjecting cellulose to a preliminary impregnating bath composed of sulfuric acid, butyric acid and water and a substance capable of preventing the sulfuric acid and water from forming a separate layer immiscible with the butyric acid.

8. The process of preparing cellulose butyrate which comprises applying to cellulose a catalyst and subjecting the cellulose to an acylating bath containing butyric anhydrid and butyric acid.

9. The process of preparing cellulose butyrate which comprises subjecting cellulose to a preliminary impregnating bath containing sulfuric acid and an organic acid carrier therefor, and thereafter subjecting the impregnated cellulose to an acylating bath containing butyric anhydrid and butyric acid.

10. The process of preparing cellulose butyrate which comprises subjecting cellulose to a preliminary impregnating bath composed of sulfuric acid, butyric acid and water, and a substance capable of preventing the sulfuric acid and water from forming a separate layer immiscible with the butyric acid, and thereafter subjecting the impregnated cellulose to an acylating bath containing butyric anhydrid and butyric acid.

11. Process of preparing cellulose butyrate which comprises subjecting cellulose to a preliminary impregnating bath composed of sulfuric acid, butyric acid and water, and a substance capable of preventing the sulfuric acid and water from forming a separate layer immiscible with the butyric acid, subjecting the impregnated cellulose to an acylating bath containing butyric anhydrid and butyric acid, permitting butyration of the cellulose to proceed until a test sample indicates a good solubility of the reaction product in chloroform, and thereupon adding sulfuric acid to the acylating mixture.

12. The process of preparing cellulose butyrate which comprises applying to cellulose a catalyst and subjecting the cellulose to an acylating bath comprising substantially 465 parts of butyric anhydrid (90%), and 400 parts of butyric acid to each 100 parts by weight of the cellulose.

13. The process of preparing cellulose butyrate which comprises subjecting cellulose to a preliminary impregnating bath composed substantially of .5 to .6% sulfuric acid, 5.7 to 7.5% alcohol and 94.5 to 91.9% butyric acid, removing from the cellulose the excess of the impregnating solution, and thereafter subjecting the cellulose to an acylating bath comprising substantially 465 parts of butyric anhydrid (90%) and 400 parts butyric acid for each 100 parts by weight of cellulose.

14. In the process of preparing cellulose butyrate, the steps which consist in subjecting cellulose to a butyrating bath in the presence of a catalyst comprising sulfuric acid, permitting the butyration of the cellulose to proceed until a test sample indicates good solubility of the reaction product in chloroform, and thereupon adding sulfuric acid to the acylating mixture.

15. The process of preparing cellulose butyrate which comprises subjecting cellulose to a preliminary impregnating bath containing substantially .5 to .6% sulfuric acid, 5.7 to 7.5% alcohol and 94.5 to 91.9% butyric acid, and thereafter subjecting the cellulose to an acylating bath containing butyric anhydrid and butyric acid, permitting butyration of the cellulose to proceed until a test sample indicates good solubility of the reaction product in chloroform and thereupon adding to the acylating mixture substantially 5% of sulfuric acid (sp. gr. 1.84), calculated on the weight of the cellulose used, and from 3 to 5% of water by volume of the acylating bath.

16. The process of preparing cellulose butyrate which comprises subjecting 100 parts of cellulose to from 1200 to 1500 parts of a preliminary impregnating solution comprising .5 to .6% sulfuric acid, 5.7 to 7.5% alcohol and 94.5 to 91.9% butyric acid for about 90 minutes, removing the excess of solution from the cellulose, subjecting the impregnated cellulose to an acylating bath comprising 465 parts of butyric anhydrid (90%), and 400 parts of butyric acid, maintaining a temperature in the acylating bath below 50° C., permitting butyration of the cellulose to proceed until a test sample indicates a good solubility of the reaction product in chloroform, and thereafter adding to the acylating mixture substantially 5 parts of sulfuric acid (sp. gr. 1.84), and 3 to 5% of water by volume calculated on the volume of the acylating bath.

17. As a new product, a cellulose butyrate soluble at normal temperatures in mixtures of benzol and alcohol.

18. As a new product, a cellulose butyrate soluble at normal temperatures in mixtures of benzol and alcohol containing from fifty to ninety-five per cent by volume of benzol, a mixture containing 75% of carbontetrachlorid and 25% of denatured alcohol, and soluble at elevated temperatures in denatured alcohol, benzol and solvent naphtha.

19. As a new product, a cellulose butyrate soluble at normal temperatures in mixtures of benzol and alcohol such as may be prepared by subjecting cellulose to a preliminary impregnating bath comprising butyric acid and a catalyst, and then subjecting the impregnated cellulose to a butyrating bath.

In testimony whereof, we affix our signatures.

GUSTAVUS J. ESSELEN, Jr.
HARRY S. MORK.